No. 688,428. Patented Dec. 10, 1901.
C. L. MERRY.
STUD ATTACHMENT FOR RIMLESS EYEGLASSES OR SPECTACLES.
(Application filed July 1, 1901.)
(No Model.)

Witnesses. Inventor.
Chas N Manning Charles L. Merry
Theodore C. Sparks. By Rich N Manning Atty.

UNITED STATES PATENT OFFICE.

CHARLES L. MERRY, OF KANSAS CITY, MISSOURI.

STUD ATTACHMENT FOR RIMLESS EYEGLASSES OR SPECTACLES.

SPECIFICATION forming part of Letters Patent No. 688,428, dated December 10, 1901.

Application filed July 1, 1901. Serial No. 66,674. (No model.)

*To all whom it may concern:*

Be it known that I, CHARLES L. MERRY, a citizen of the United States of America, residing at Kansas City, in the county of Jackson and State of Missouri, have invented a certain new and useful Improvement in Stud Attachments for Rimless Eyeglasses or Spectacles; and I do hereby declare that the following is a full, clear, and exact description of the invention, such as will enable others to make and use the same, reference being had to the accompanying drawings, forming a part of this specification.

The objects of my invention are, first, to afford an accurate conjunction of the stud and lens, and, second, to obviate breaking of the lens from undue expansion of the connecting parts.

The invention consists in the novel construction and combination of parts, such as will be first fully described, and specifically pointed out in the claims.

Figure 1:
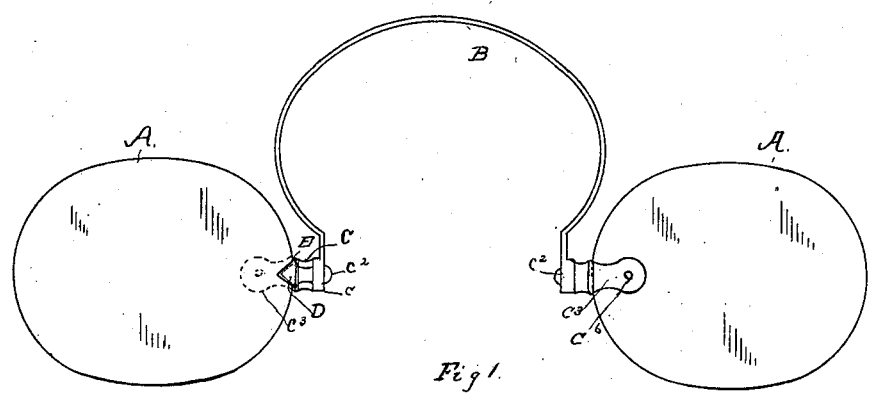
Figure 4:
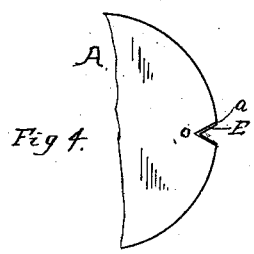
Figures 2, 3:
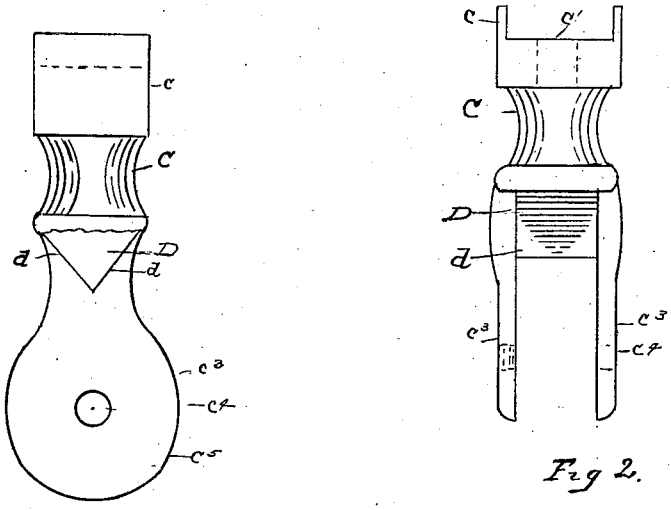

In the drawings, Figure 1 is a front view of a pair of rimless eyeglasses or lenses, showing the studs and the lens-holding members or plates secured to the lenses, one of which is broken away to show the invention. Fig. 2 is an enlarged detail plan view of the improved stud. Fig. 3 is a detail side view of the improved stud, with one of the lens-holding members or plates broken away to show the intermediate wedge on the stud to engage with the notched lens. Fig. 4 is a detail broken portion of the eyeglass to show the nick and packing.

Similar letters of reference indicate corresponding parts in all the figures of the drawings.

Referring to the drawings, A A represent a pair of rimless eyeglasses.

B represents the arched or curved nose-strips, and C represents the stud. The stud C at the outer end $c$ is rectangular in shape and is grooved in a vertical direction at $c'$ to receive the free end of the nose-strip B, in which groove the said free end is secured by the small screw $c^2$. Extending in an opposite direction to the grooved parts and from the other end of the stud are lens-holding members or plates $c^3 c^3$, which are flat upon the inner side and arranged the proper distance apart to extend upon each side of the lens A and are perforated transversely at $c^4$. These plates are ordinarily short in length and the outer ends of which at $c^5$ are curved in the arcs of circles.

In the details of my invention a wedge D on the stud C is made between its lens-holding plates $c^3 c^3$ a short distance outwardly from the stud and extending laterally to and connected with the inner sides of plates $c^3 c^3$. The upper and lower surfaces or faces $d d$ of the wedge D, which are at right angles to the plates $c^3 c^3$, are inclined from the stud C toward each other and meet at a point, thus forming a wedge for the purpose hereinafter explained.

In the edge of the eyeglass A and at the end of said glass to which the attachment of the stud is made and in the line of the axis of its greater length is a nick $a$, extending transversely to the lens, which is V-shaped, the sides of which V-shaped depression are slightly wider apart than the thickness of the wedge D through the inclined sides $d d$. In the V-shaped depression or nick $a$ in the lens is a packing E, composed of yielding material, such as soft lead or rubber or other suitable material, which fits snugly against the opposite sides of the nick $a$. As thus prepared the lens A is then inserted between the plates $c^3 c^3$ of the stud with the nick $a$ toward the projection D, the sides $d d$ of which wedge extend within the nick against the packing E, and so fit snugly therein. A small screw $c^6$ is then extended through the perforations $c^4$ in the plates $c^3$, which passes through the lens A and in the threaded perforation of the opposite plate, and the connection is firm and unyielding.

I am aware that stud attachments for lenses have been constructed with members one bearing on each face of the lens and with a projection between these members engaging with a cut or nick in the edge of the lens. I am also aware that a cushion has been applied between the ordinary stud and lens and also between the lens-holding members and the lens to protect the screws from contact with the lens. I am not aware of any invention hitherto which devises means for the accurate fitting of a projection upon the stud and the nick in the lens. While the packing obviates the breaking of the lens, an oculist experiences much difficulty in fitting the projection within the nick and at the same time securing the members of the stud to the lens. It is obvious in making an accurate conjunction of the wedge on the stud with the nick that the nick may be other than V-shaped. The nick being larger than the wedge, the fitting parts of the wedge upon the soft packing will displace the packing to accommodate itself to the variances in the width of the nick.

Such modifications may be employed as are within the scope of the invention.

The improvement is applicable to spectacles as well as to eyeglasses and affords an efficient and expeditious adjustment.

Having fully described my invention, what I claim as new, and desire to secure by Letters Patent, is—

The combination with a rimless lens of a stud, lens-holding members or plates one bearing on each face of the lens, a fastening device extending through the outer ends of said plates and said lens, a wedge on said stud intermediate said lens-holding plates, said lens having a nick in its edge of an increased width to that of the said wedge and means for obtaining an accurate conjunction of said wedge and nick comprising a soft packing on the inner surfaces of the said nick in which the wedge is fitted.

In testimony whereof I have signed my name to this specification in the presence of the two subscribing witnesses.

CHARLES L. MERRY.

Witnesses:
FRANCIS A. LEACH,
THEODORE C. SPARKS.